(12) United States Patent
Flowers

(10) Patent No.: US 6,447,682 B1
(45) Date of Patent: Sep. 10, 2002

(54) PROCESS AND SYSTEM FOR ENHANCED NITROGEN REMOVAL IN A WETLAND WASTEWATER TREATMENT FACILITY

(76) Inventor: David A. Flowers, P. O. Box 65, Cedarburg, WI (US) 53012-0065

(*) Notice: Subject to any disclaimer, the term of this patent is extended or adjusted under 35 U.S.C. 154(b) by 0 days.

(21) Appl. No.: 09/681,978

(22) Filed: Jul. 3, 2001

(51) Int. Cl.[7] .................................................. C02F 3/32
(52) U.S. Cl. ........................ 210/602; 210/605; 210/747; 210/170; 210/194; 210/199; 210/903; 210/908
(58) Field of Search ............................... 210/602, 605, 210/747, 170, 194, 199, 903, 908

(56) References Cited

U.S. PATENT DOCUMENTS

| | | | |
|---|---|---|---|
| 5,156,741 A | * | 10/1992 | Morrison et al. |
| 5,174,897 A | | 12/1992 | Wengrzynek ............... 210/602 |
| 5,863,433 A | * | 1/1999 | Behrends |
| 5,893,975 A | | 4/1999 | Eifert ......................... 210/602 |
| 5,951,866 A | | 9/1999 | Grove et al. ................ 210/602 |
| 5,993,649 A | | 11/1999 | DeBusk et al. ............... 210/97 |
| 6,126,827 A | | 10/2000 | Johnson, Jr. et al. ....... 210/602 |
| 6,159,371 A | | 12/2000 | Dufay ......................... 210/602 |
| 6,200,469 B1 | | 3/2001 | Wallace ....................... 210/150 |

OTHER PUBLICATIONS

Pipeline, National Small Flows Clearinghouse, Summer 1998, vol. 9, No. 3.
Steiner, Gerald R. et al., *General Design, Construction, and Operation Guidelines*, Mar. 1991.
Steiner, Gerald R., et al., *General Design, Construction and Operation Guidelines, Design Manual#65*, May 1993.
McCarthy, Barbara, et al., *Development of Alternative On–Site Treatment Systems for Wastewater Treatment: A Demonstration Project for Northern Minnesota*, Dec. 31, 1997, p. ii–14 and 29–30.
Kadlec, Robert H., et al., *Treatment Wetlands*, Chapter 13, pp. 373–442, 1996.
United States Environmental Protection Agency, *Constructed Wetlands Treatment and Municipal Wastewaters Manual*, Sep. 2000.

* cited by examiner

Primary Examiner—Betsey Morrison Hoey
(74) Attorney, Agent, or Firm—Whyte Hirschboeck Dudek SC

(57) ABSTRACT

A process and system for enhanced nitrogen removal in a wetlands wastewater treatment facility is disclosed. Air is bubbled into the wetland to form an overall aerobic zone to enhance nitrification of the ammonia in the wastewater. A portion of the effluent is recycled back to the nutrient rich, anaerobic zone of the inlet of the wetland to enhance denitrification of the wastewater.

36 Claims, 4 Drawing Sheets

PROCESS AND SYSTEM FOR ENHANCED NITROGEN REMOVAL IN A WETLAND WASTEWATER TREATMENT FACILITY

BACKGROUND OF INVENTION

The present invention relates to a process and system for treating wastewater in a constructed wetland facility.

The use of constructed wetlands for the treatment of wastewater is becoming an 3increasingly popular option especially in rural or lightly developed areas. Constructed wetlands use wetland plants and bacteria to remove pollutants from the wastewater.

Existing constructed wetlands, including surface water and subsurface flow systems, use wetland plants and atmospheric diffusion to transfer oxygen into the water. At the inlet-to the constructed wetlands, the high concentration of organic matter in the wastewater provides a rich energy source for biological activity. This activity is so vigorous that any oxygen transferred into the water is immediately consumed resulting in an essentially oxygen-free (anaerobic) zone. The organic material is consumed by the biological activity so that, as the wastewater flows through the wetland, the concentration of organic matter is rapidly reduced. The reduction in the energy source represented by the organic matter reduces the rate of microbiological activities such that an anoxic regime is formed wherein the oxygen transferred into the water is not necessarily immediately consumed but the water is still oxygen starved. The plants and water surface can provide natural aerobic zones within the constructed wetland, especially in the anoxic zone. These aerobic zones provide for efficient conversion of ammonia or ammonium ions into nitrates. The nitrates are bacteriologically reduced to nitrogen gas but such microbiological activity is inhibited by the presence of free oxygen in the aerobic zones and the anoxic zones.

A number of processes and systems have been developed to increase the aerobic activity in a constructed wetland to improve the conversion of ammonia/ammonium to nitrates. For example, U.S. Pat. No. 5,893,975 discloses a subsurface flow constructed wetland including a wastewater treatment system having a flow intake, a pretreatment nutrient addition chamber and a wastewater flow divider. The flow divider further has a compressed air aerator in the bottom thereof. An object of the invention of U.S. Pat. No. 5,893,975 is to install a supplemental air diffuser system along the bottom of the influent distribution chamber therein to facilitate initial precipitation of sludge and to prevent potential septic and/or anaerobic conditions at the initial point of treatment to significantly enhance system performance.

U.S. Pat. No. 6,126,827 discloses a wastewater treatment system wherein the liquid component is subjected to a two-part treatment wherein the first part of the treatment is carried out on a sequencing batch reactor and the second part is carried out in at least one reed bed. The wastewater entering the reed bed is comparable in quality to secondary treated wastewater except that a substantial amount of total nitrogen has also been removed.

U.S. Pat. No. 6,159,371 discloses constructed wetlands, utilizing a plurality of cells, in which nitrification and denitrification occurs simultaneously at low flow rates and lower temperatures.

The constructed wetland provides improved remediation in a shorter period of time.

U.S. Pat. No. 6,200,469 B1 discloses a system for removing pollution from water, utilizing a subsurface constructed wetland system using forced bed aeration and variable water levels, to promote greater root depth and better root structure of the wetland vegetation, and to establish staged anaerobic and aerobic zones within the system.

None of the prior art systems provide for denitrification of the wastewater in a highly anaerobic, nutrient rich zone near the inlet of the constructed wetlands. It is a hallmark of the current invention to provide for denitrification of wastewater in the anaerobic nutrient rich zone at the inlet to the constructed wetland.

SUMMARY OF INVENTION

The present invention provides a process and system for enhanced nitrogen removal in a wetland wastewater treatment facility that overcomes the aforementioned problems.

In a preferred embodiment, a constructed wetland wastewater treatment system is provided comprising: a constructed wetland comprising a reservoir defining a flow channel for the wastewater, the wastewater at least partially filling the reservoir, the reservoir having a lower surface, an inlet end where wastewater to be treated is introduced into the reservoir and an outlet end where treated water is discharged from the reservoir, wherein the water flows from the inlet end toward the outlet end; a source of pressurized air; a gas distributor in fluid communication with the source of pressurized air, the gas distributor being immersed in the water at least partially filling the reservoir at a location at or proximate to the lower surface and between the inlet end and the outlet end; and, a recycle system capable of moving treated water from the outlet end to the inlet end.

In another preferred embodiment, a constructed wetland wastewater treatment system is provided comprising: a constructed wetland comprising a reservoir defining a flow channel for the wastewater, the wastewater at least partially filling the reservoir, the reservoir having a lower surface, an inlet end where wastewater to be treated is introduced into the reservoir and an outlet end, wherein the water flows from the inlet end toward the outlet end; means for distributing air into the water at least partially filling the reservoir; and means for recycling treated water from the outlet end to the inlet end.

In still another preferred embodiment, a constructed wetland wastewater treatment system is provided comprising: a constructed wetland comprising a reservoir defining a flow channel for the wastewater, the wastewater at least partially filling the reservoir, the reservoir having an inlet end where wastewater to be treated is introduced into the reservoir, an outlet end where treated water is discharged from the reservoir, at least two sides, each side having an upstream end connected to the inlet end of the reservoir and a downstream end connected to the outlet end of the reservoir, and a bottom surface connected to the inlet end, the outlet end and the at least two sides, wherein the wastewater flows from the inlet end toward the outlet end; a source of pressurized air; a gas distributor in fluid communication with the source of pressurized air, the gas distributor being immersed in the wastewater at least partially filling the reservoir and extending substantially from one side of the reservoir to the other side of the reservoir at a location between the inlet end and the outlet end, such that, when air is distributed through the gas distributor, the wastewater in the reservoir is divided into an overall anaerobic zone proximate to the inlet, an overall aerobic zone proximate to the gas distributor and an overall anoxic zone proximate to the outlet end; and, mans for recycling treated water from the outlet end to the inlet end.

In yet another embodiment of the invention, a process is provided for improved nitrogen removal from wastewater treated in a constructed wetland wastewater system, the process comprising the steps of: providing a constructed wetland having an inlet end, an outlet end and means for distributing air located in the wetland intermediate to the inlet end and the outlet end and means for recycling water, the wetlands adapted to facilitate flow of wastewater from the inlet end to the outlet end; introducing wastewater to the wetland at or proximate to the inlet end, the wastewater comprising nitrogen containing organic material; allowing the wastewater to flow from the inlet end to the outlet end; allowing overall anaerobic conditions to form in the wastewater proximate to the inlet end and overall anoxic conditions to form in the wastewater proximate to the outlet end; introducing air into the wastewater through the means for distributing air such that an overall aerobic zone is formed in the wastewater proximate to the means for distributing air intermediate to the overall anaerobic zone and the overall anoxic zone, the zones situated such that the overall aerobic zone provides a substantially complete separation of the overall anaerobic zone from the overall anoxic zone; draining water from the outlet end of the wetland; and recycling some of the water drained from the outlet end to the inlet end of the wetland.

Various other features, objects and advantages of the present invention will be made apparent from the following detailed description and the drawings.

BRIEF DESCRIPTION OF DRAWINGS

Preferred embodiments of the invention are described below with reference to the following accompanying drawings, which are for illustrative purposes only. Throughout the following views, reference numerals will be used in the drawings, and the same reference numerals will be used throughout the several views and in the description to indicate same or like parts.

In the drawings.

DETAILED DESCRIPTION

In the following detailed description, references made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the spirit and scope of the present invention.

Figure 1:
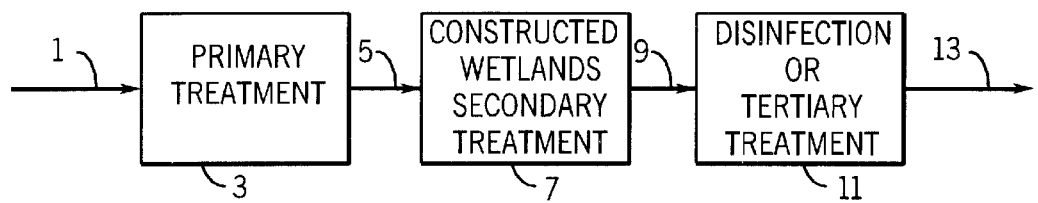
FIG. 1 is a process flow chart of a typical constructed wetland wastewater treatment system.
Figure 2:
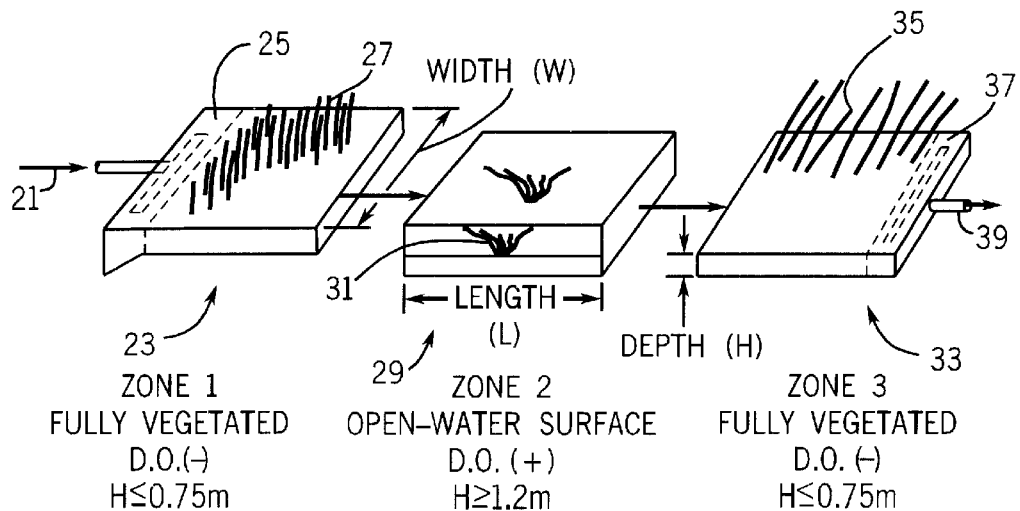
FIG. 2 is an exploded view of a typical free water surface constructed wetland.
Figure 3:
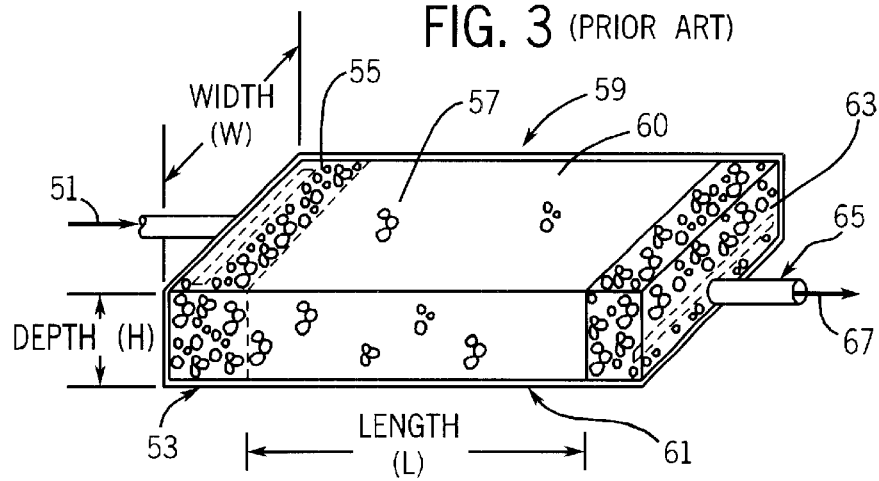
FIG. 3 is a perspective view of a typical vegetated submerged bed constructed wetland.

FIG. 1 shows the process flow of a typical wastewater treatment system comprising a constructed wetland. Raw wastewater 1 goes into a primary treatment system 3 where solids may be removed by settling. Primary effluent S is transferred from primary treatment 3 to the constructed wetland 7, where the wastewater is treated through the wetland and exits the wetland as secondary effluent 9. The secondary effluent 9 may be disinfected or tertiary treated 11 to form the final discharge 13. Typical constructed wetlands are shown in FIGS. 2 and 3. FIG. 2 shows the elements of a free water surface constructed wetland. Influent 21 enters zone 23 of the wetland through inlet settling zone 25. The wastewater flows through floating and emergent plants 27 to reach the second zone 29. Submerged growth plants 31 in the second zone 29 provide for further treatment of the wastewater which then flows to a third zone 33. Floating and emergent plants 35 provide oxygen and nitrogen transfer for the final treatment of the wastewater which then flows into outlet zone 37 and discharges through variable level outlet 39.

FIG. 3 shows the elements of a vegetated submerged bed system. Pretreated influent 51 flows into the wetland which is contained within liner 53. The influent is distributed through the wetland in inlet zone 55. The wetland has a top slope 57 which typically is flat with no grade. The wetland also has bottom slope 61 which is generally less than or equal to 1% grade moving downward from inlet zone 55 to outlet zone 63. Treatment zone 59 is typically filled with media 60. The media 60 may be sand, rocks and plant roots. The wastewater flows through the media 60 to outlet zone 63 and from there through the variable outlet 65 the effluent 67 is discharged.

In either the free water surface constructed wetland or the vegetated submerged bed wetland, the influent 21 or 51, respectively, enters the wetland with a heavy organic material load (represented by a high biochemical oxygen demands (B.O.D.)) comprising proteins, urea and other organic nitrogen sources. Bacteria convert the nitrogen from the proteins and urea into ammonia or ammonium ions. The high concentration of organic material fuels the microbiological reactions such that no free oxygen is present and the wastewater near the inlet is substantially anaerobic. As the wastewater flows through the wetland and the organic material is consumed, some free oxygen is available and the wastewater is considered anoxic. In the anoxic zone, ammonia and ammonium is converted to nitrites and nitrates. The nitrites rapidly oxidize to nitrates.

These soluble nitrates will exit the wetlands with the effluent in unacceptably high concentrations unless denitrified. Denitrification is a microbiological process which converts the nitrate into nitrogen gas. The denitrification process is inhibited by the presence of free oxygen and therefore occurs relatively slowly in the anoxic wastewater of the wetlands. Moreover, the anoxic zone is significantly depleted of the organic material necessary to fuel the biochemical reactions. Prior art systems that aerate the wastewater in the wetlands provide oxygen that aids the conversion of ammonia to nitrate. However, because these prior art systems tend to add the air throughout the wetlands or at the inlet to the wetlands, the oxygen curtails the denitrification reaction.

Figure 4:
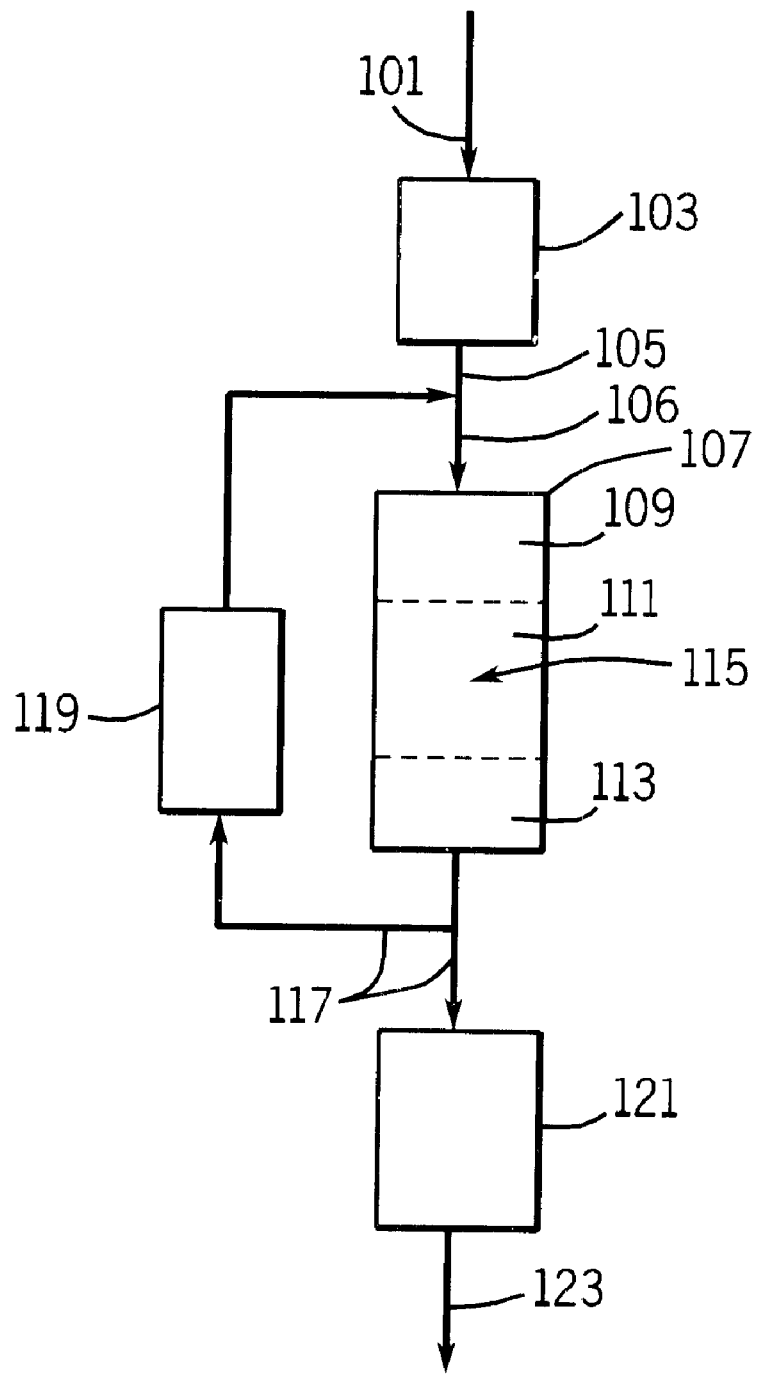
FIG. 4 is a process flow chart of the inventive constructed wetland wastewater treatment system.

The enhanced nitrogen removal process of the current invention is illustrated in FIG. 4. Raw wastewater 101 enters an optional primary treatment 103. The primary effluent 105, or, alternatively, raw wastewater 101, enters as the influent 106 to constructed wetland 107. Except as further described herein, wetland 107 may be any type of wetland known in the art, for example, the wetland of FIG. 3. Wetland 107 comprises a reservoir which is at least partially filled with water. Wetland 107 is functionally divided into three zones, 109, 111 and 113. Zone 109 is an overall anaerobic zone.

Zone 111 is an overall aerobic zone where air 115 is supplied. Zone 113 is an overall anoxic zone. Effluent 117 proceeds to the optional tertiary treatment 121 and proceeds on to final discharge 123. A portion of effluent 117 is returned by recycle 119 to the influent 106 to the wetland 107.

Zone 109 is an overall anaerobic zone. Overall anaerobic means that, on a macro scale, free oxygen is not present in the wastewater and reactions occur using the molecular oxygen of the reactants. One skilled in the art will recognize that there will be micro locations which would be characterized as either anoxic or aerobic. These micro locations are typically formed around sources of oxygen, such as plant roots or water surfaces. However, these anoxic and/or aerobic micro locations are of lesser impact compared to the function of the zone in total.

Zone 111 is characterized as overall aerobic. Overall aerobic means that the wastewater contains free oxygen which is available for microbiological reactions. However, once again, one skilled in the art will readily recognize that micro locations will exist within the overall aerobic zone where anoxic and anaerobic conditions prevail. Such conditions are typical of inter alia, the bacterial film formed around rocks comprising the media of a subsurface bed. The outer layers of the bacteria film will be aerobic but, because the concentration of oxygen within the film is limited by the permeation of oxygen through the film layers, the bacteria further from the surface become anoxic and finally anaerobic. Such anoxic and anaerobic micro locations are of lesser impact compared with the overall functioning of the aerobic zone 111.

Zone 113 is an overall anoxic zone. An overall anoxic zone is relatively oxygen-starved and little or no free oxygen will be available in the wastewater. Bacteria that thrive in an anoxic zone are able to fluctuate between anaerobic and aerobic metabolisms depending on the availability of free oxygen. As with the previous two zones, micro locations of aerobic activity and anaerobic activity will be present within the overall anoxic zone but are of lesser impact compared to the overall functioning of the anoxic zone.

Influent 106 has a high concentration of organic materials (i.e., a high BOD) comprising nitrogen containing organic compounds. When the wastewater with high organic concentration enters anaerobic zone 109, the nitrogen is microbially modified into ammonia or ammonium ions, depending upon the pH of the water. This creates a relatively high concentration of ammonia/ammonium in the wastewater of zone 109. As the water flows from zone 109 into zone 111, air 115 is introduced into the water thereby oxygenating the water and making zone 111 aerobic.

Figure 5:
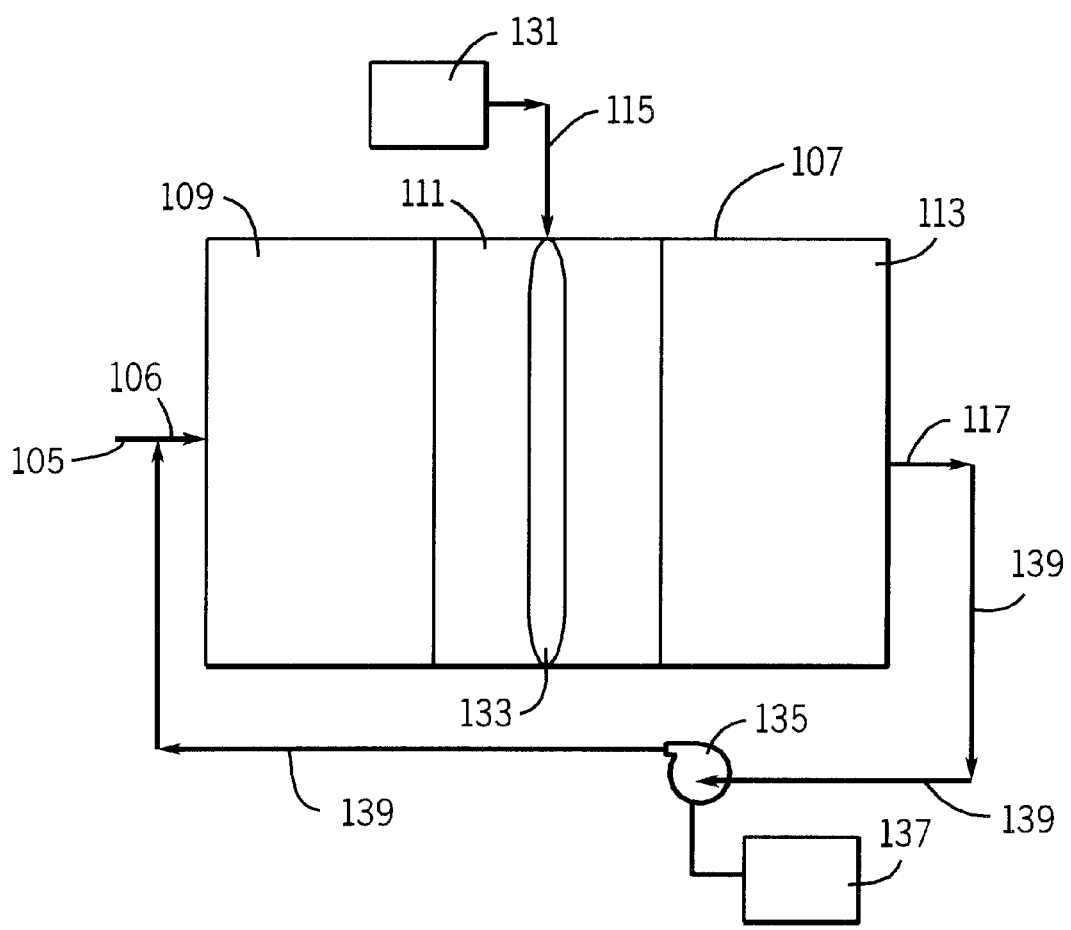
FIG. 5 is a schematic top view of the flow paths in a constructed wetland of the current invention.

Referring to FIG. 5, air 115 is introduced into the wastewater through a gas distribution manifold (also known as a gas distributor) 133 located within the wetland. Gas distribution manifold 133 should be located far enough downstream from the inlet so that the organic matter concentration in the wastewater has been substantially reduced. It is felt that locating gas distribution manifold 133 in the middle third of the length of the wetland 107, preferably about half-way downstream, provides suitable results.

The gas distributor is immersed within the water of the wetland. Preferably, the gas distributor is located at the bottom surface of the reservoir, or is at least proximate to the bottom surface. Preferably, the gas distributor spans all, or substantially all, of the width of the reservoir of the wetland. The gas distributor should be designed so that the aerobic zone 111 arising from aeration of the water provides effective separation of the anaerobic zone 109 and the anoxic zone 113.

The gas distribution manifold may be a sparger, simple bubbler or a porous septa. Spargers and simple bubblers are the simplest method of dispersing gas in a liquid and typically comprise horizontal perforated pipe or hose, or a perforated plate at the bottom of the liquid. At ordinary gassing rates relatively large bubbles will be produced regardless of the size of the orifices. Perforated pipe or plate spargers usually have orifices ⅛ to ½ inch in diameter. The perforated pipe spargers should be so designed that the pressure drop across the individual orifices is large compared with the pressure drop down the length of the pipe otherwise the orifices most remote from the gas supply may not function. In the quiescent regime (superficial gas velocity less than 0.15–0.2 feet per second) the above-mentioned spargers are usually operated at orifice Reynolds numbers in excess of 6,000 in order to get small bubbles so as to increase the interfacial area and thus increase mass transfer. In the turbulent regime (superficial gas velocity greater than 0.15 0.2 feet per second) the spargers design is not critical because the balance between coalescence and break-up of the bubbles is established very quickly.

In the quiescent regime porous plates, tubes, disks, or other shapes which are made by bonding or sintering together carefully-sized particles of carbon, ceramic, polymer or metal are frequently used for gas dispersion. The resulting septa may be used as spargers to produce much smaller bubbles than what will result from a simple bubbler. The gas flux through a porous septum is limited on the lower side by the requirement that, for a good performance, the whole sparger surface should bubble more or less uniformly, and, on the higher side, by the onset of serious coalescence at the surface of the septum, resulting in poor dispersion. In the practical range of fluxes, the size of the bubbles produced depends on both the size of pores in the septum and the pressure drop imposed across it, being a direct function of both.

Low pressure, high volume air 115 is supplied to gas distribution manifold 133 from compressor 131. Compressor 131 can be any suitable device but is preferably a windmill or solar powered device. One skilled in the art will recognize that the pressure and volume of air is adjustable and should be varied as required by the conditions of the wetland. The pressure generated by the compressor must be sufficient to overcome the hydraulic head at the gas distribution manifold and the pressure drop through the manifold and orifices/septa. The air flow rate should be adjusted to obtain the desired oxygen concentration in the wastewater and to form the desired bubble size.

Within the aerobic conditions of zone 111, the ammonia is microbiologically modified into nitrite and nitrates. The nitrites are unstable in such an environment and rapidly oxidize into nitrates. As such, the wastewater within zone 111 is relatively high in nitrate concentration. As the nitrate-laden wastewater exits zone 111 and enters zone 113, further microbiological reactions occur. In denitrification, the enzyme nitrate reductase allows certain genera of bacteria to use the more tightly bound oxygen atoms of nitrate and nitrite molecules as the final electron acceptor. The most common facultative bacterial groups that accomplish denitrification include Bacillus, Enterobacter, Micrococcus, Pseudomonas, and Spirillum. These genera can switch easily from anoxic to aerobic metabolism because of the biochemical similarities of the two processes. However, because the use of free oxygen as the final electron acceptor (as in the Krebs cycle) yields more energy than the use of oxygen from nitrate, these organisms will typically not denitrify nitrate in the presence of free oxygen. In general, the denitrifying bacteria do not completely remove the nitrates from the wastewater and so a certain amount of nitrates exit the wetland 107 via effluent 117. Effluent 117 may pass through optional treatment system 121, which may be another wetland, before being dispersed 123. By recycling a portion of effluent 117 through recycle means 119 back into zone 109, the denitrification reaction is allowed to occur in an anaerobic zone which strongly favors the denitrification reaction. Moreover, because zone 109 is rich in organic nutrients, the denitrifying bacteria have a readily available food source to fuel the denitrifying reaction. As such, in the current invention, the predominant reactions in zone 109 are the conversion of nitrogen products to ammonia and the denitrifying nitrates to nitrogen gas.

Any suitable means may be used as recycle means 119. Referring again to FIG. 5, a suitable means for recycle comprises means to provide fluid communication 139 between the effluent 117 and the influent 106 and means to provide enough potential energy 135 to transfer effluent 117 through the means for fluid communication 139. Means for fluid communication 139 will typically be a trench or a pipe, preferably a buried pipe, most preferably a buried PVC pipe. Means for providing potential energy 135 to enable the water to flow through the means for fluid communication 139 are well known in the art. Examples of such devices include those that develop pressure (e.g., a pump) and devices that provide potential energy by raising the elevation of the water (e.g., bucket lifts or Archimedes screws). Both positive displacement pumps and pressure pumps, e.g., centrifugal pumps, are useful in the recycle means of this invention. In a preferred embodiment, the means is a centrifugal pump. Power to supply the means for providing potential energy can come from any suitable source 137 such as generators, photovoltaic cells or wind power, preferably, photovoltaic cells or a windmill.

Any practical recycle rate may be used in the practice of this invention. Recycle rate is defined as the amount of water recycled as a percentage of the total effluent flow. As one skilled in the art will readily recognize, higher recycle rates will provide more improvement in denitrification than do low recycle rates. However, higher recycle rates require larger, more expensive equipment and treatment cells and have associated higher energy costs.

Figure 6:
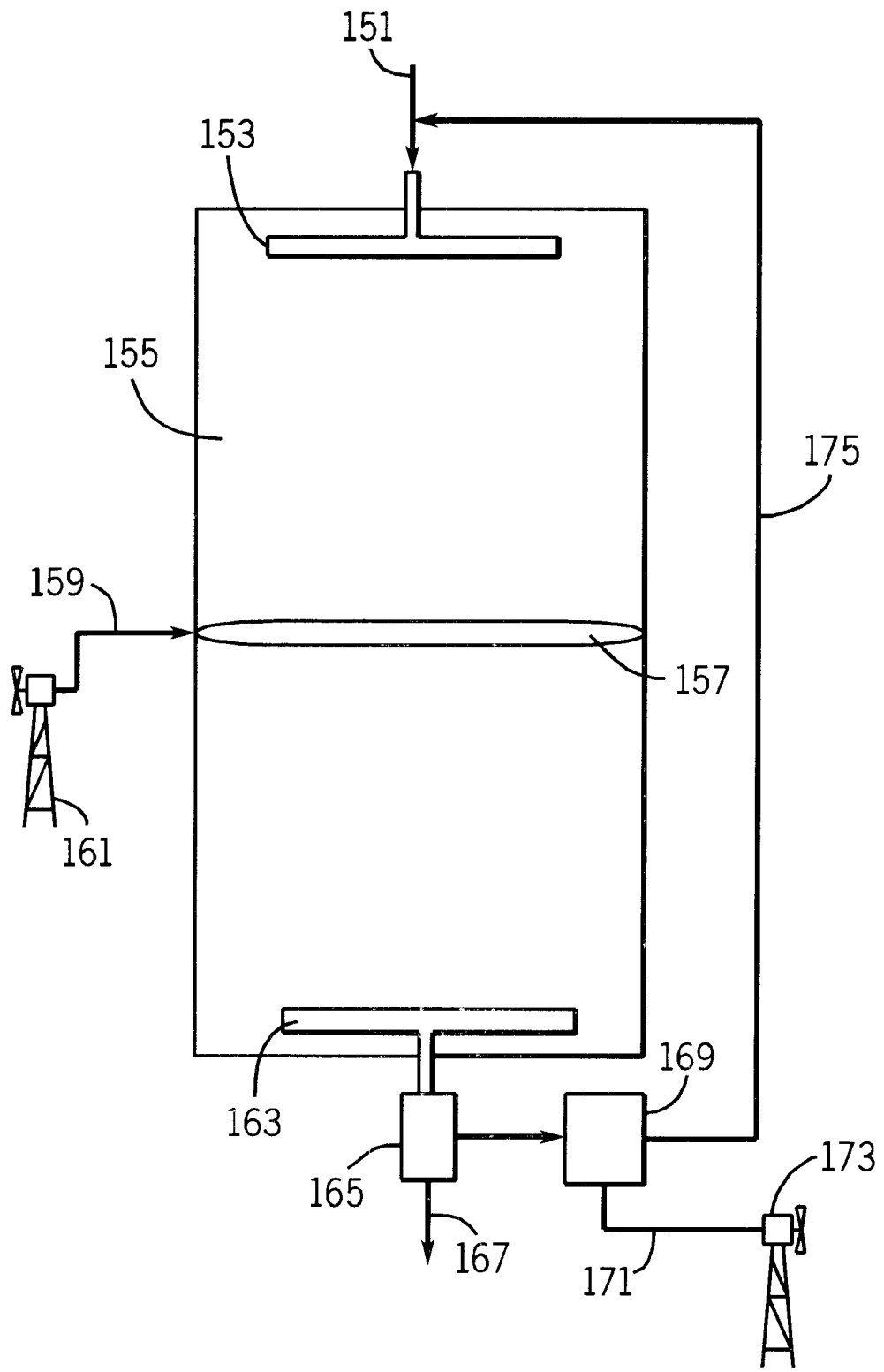
FIG. 6 is a schematic view of a preferred embodiment constructed wetland of the current invention.

Examples A system usable for the current invention is shown in FIG. 6. Referring to FIG. 6, influent wastewater 151 enters constructed wetland 155 through inlet distribution manifold 153. Wetland 155 comprises a media of stones and cobbles (not shown). Gas distribution manifold 157 is located within the wetland at a point downstream from inlet manifold 153.

In the unit shown, the length of wetland 155 is 60 feet. The gas distribution manifold 157 is located 24 feet from the inlet distribution manifold 153. Low pressure, high volume air 159 is supplied to gas distribution manifold 157 from compressor 161 which is a windmill device as shown. Compressor 161 is designed to produce 5 psig air at 15 standard cubic feet per minute (scfm). Higher pressure, such as 10 psig, may be needed for maintenance and cleaning purposes. Outlet manifold 163 collects wastewater effluent 167 and delivers it to flow divider 165. Flow divider 165 is typically, and preferably, a piping tee. Effluent 167 is then discharged to either further treatment processing or to the environment. Some of effluent 167 is divided in flow divider 165 and proceeds to centrifugal pump 169. The centrifugal pump 169 may be powered by a solar array or, as shown, by wind generator 173 which produces electricity 171. Centrifugal pump 169 forces the effluent 167 through piping 175 back to input manifold 153. The system is designed for recycle rates of up to about 100%.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A constructed wetland wastewater treatment system comprising:
   A) a constructed wetland comprising a reservoir defining a flow channel for the wastewater, the wastewater at least partially filling the reservoir, the reservoir having a lower surface, an inlet end where wastewater to be treated is introduced into the reservoir and an outlet end where treated water is discharged from the reservoir, wherein the water flows from the inlet end toward the outlet end;
   B) a source of pressurized air;
   C) a gas distributor in fluid communication with the source of pressurized air, the gas distributor being immersed in the water at least partially filling the reservoir at a location at or proximate to the lower surface and between the inlet end and the outlet end; and,
   D) a recycle system capable of moving treated water from the outlet end to the inlet end.

2. The constructed wetland of claim 1 wherein the pressurized air has a pressure of no greater than 10 psig.

3. The constructed wetland of claim 1 wherein the gas distributor is selected from the group consisting of perforated pipes, perforated hose, perforated plate, porous septa or a combination thereof.

4. The constructed wetland of claim 3 wherein the gas distributor is a porous septa.

5. The constructed wetland of claim 4 wherein the recycle system comprises a pump and piping.

6. The constructed wetland of claim 5 wherein the pump is a centrifugal pump.

7. The constructed wetland of claim 5 wherein the pump is a positive displacement pump.

8. The constructed wetland of claim 5 wherein the pump is powered by photovoltaic cells or by wind.

9. A constructed wetland wastewater treatment system comprising:
   A) a constructed wetland comprising a reservoir defining a flow channel for the wastewater, the wastewater at least partially filling the reservoir, the reservoir having a lower surface, an inlet end where wastewater to be treated is introduced into the reservoir and an outlet end, wherein the water flows from the inlet end toward the outlet end;
   B) means for distributing air into the water at least partially filling the reservoir; and
   C) means for recycling treated water from the outlet end to the inlet end.

10. The constructed wetland of claim 9 wherein the means for distributing air comprises a source of pressurized air.

11. The constructed wetland of claim 10 wherein the source of pressurized air is powered by wind power.

12. The constructed wetland of claim 9 wherein the means for distributing air is selected from the group consisting of perforated pipe, perforated hose, perforated plate, porous septa or a combination thereof.

13. The constructed wetland of claim 12 wherein the gas distributor is a porous septa.

14. The constructed wetland of claim 9 wherein the means for recycling treated water comprises a pump and piping.

15. The constructed wetland of claim 14 wherein the pump is a centrifugal pump.

16. The constructed wetland of claim 14 wherein the pump is a positive displacement pump.

17. The constructed wetland of claim 14 wherein the pump is powered by wind power or photovoltaic cells.

18. A constructed wetland wastewater treatment system comprising:

A) a constructed wetland comprising a reservoir defining a flow channel for the wastewater, the wastewater at least partially filling the reservoir, the reservoir having an inlet end where wastewater to be treated is introduced into the reservoir, an outlet end where treated water is discharged from the reservoir, at least two sides, each side having an upstream end connected to the inlet end of the reservoir and a downstream end connected to the outlet end of the reservoir, and a bottom surface connected to the inlet end, the outlet end and the at least two sides, wherein the wastewater flows from the inlet end toward the outlet end;

B) a source of pressurized air;

C) a gas distributor in fluid communication with the source of pressurized air, the gas distributor being immersed in the wastewater at least partially filling the reservoir and extending substantially from one side of the reservoir to the other side of the reservoir at a location between the inlet end and the outlet end, such that, when air is distributed through the gas distributor, the wastewater in the reservoir is divided into an overall anaerobic zone proximate to the inlet, an overall aerobic zone proximate to the gas distributor and an overall anoxic zone proximate to the outlet end; and, D) means for recycling treated water from the outlet end to the inlet end.

19. The constructed wetland of claim 18 wherein the source of pressurized air is a wind powered compressor.

20. The constructed wetland of claim 18 wherein the source is a solar powered compressor.

21. The constructed wetland of claim 18 wherein the gas distributor is selected from the group consisting of perforated pipe, perforated hose, perforated plate or porous septa.

22. The constructed wetland of claim 21 wherein the gas distributor is a porous septa.

23. The constructed wetland of claim 18 wherein the means for recycling treated water comprises a pump and piping.

24. The constructed wetland of claim 23 wherein the pump is a centrifugal pump.

25. The constructed wetland of claim 23 wherein the pump is a positive displacement pump.

26. The constructed wetland of claim 23 wherein the pump is wind or photovoltaic cell powered.

27. A process for improved nitrogen removal from wastewater treated in a constructed wastewater system, the process comprising the steps of:

A) providing a constructed wetland having an inlet end, an outlet end and means for distributing air located in the wetland intermediate to the inlet end and the outlet end and means for recycling water, the wetlands adapted to facilitate flow of wastewater from the inlet end to the outlet end;

B) introducing wastewater to the wetland at or proximate to the inlet end, the wastewater comprising nitrogen containing organic material;

C) allowing the wastewater to flow from the inlet end to the outlet end;

D) allowing overall anaerobic conditions to form in the wastewater proximate to the inlet end and overall anoxic conditions to form in the wastewater proximate to the outlet end;

E) introducing air into the wastewater through the means for distributing air such that an overall aerobic zone is formed in the wastewater proximate to the means for distributing air intermediate to the overall anaerobic zone and the overall anoxic zone, the zones situated such that the overall aerobic zone provides a substantially complete separation of the overall anaerobic zone from the overall anoxic zone;

F) draining water from the outlet end of the wetland; and

G) recycling some of the water drained from the outlet end to the inlet end of the wetland.

28. The process of claim 27 wherein the means for recycling water comprises a pump and piping.

29. The process of claim 28 wherein the pump is a centrifugal pump.

30. The process of claim 28 wherein the pump is a positive displacement pump.

31. The process of claim 29 wherein the pump is powered by wind power or photovoltaic cells.

32. The process of claim 30 wherein the pump is powered by wind power or photovoltaic cells.

33. The process of claim 28 wherein the wastewater flows sequentially through the overall anaerobic zone, the overall aerobic zone and the overall anoxic zone.

34. The process of claim 28 wherein the recycle rate is at least 50%.

35. The process of claim 28 wherein the means for distributing air comprises a gas distributor selected from the group consisting of perforated pipe, perforated hose, perforated plate, porous septa or a combination thereof.

36. The process of claim 34 wherein the gas distributor is a porous septa.

* * * * *